Oct. 10, 1967  M. R. SCHROEDER  3,346,067
SYSTEM FOR DETERMINING ACOUSTIC REFLECTION COEFFICIENTS
Filed March 16, 1966  3 Sheets-Sheet 1

INVENTOR
M. R. SCHROEDER
BY
ATTORNEY

Figure 2:
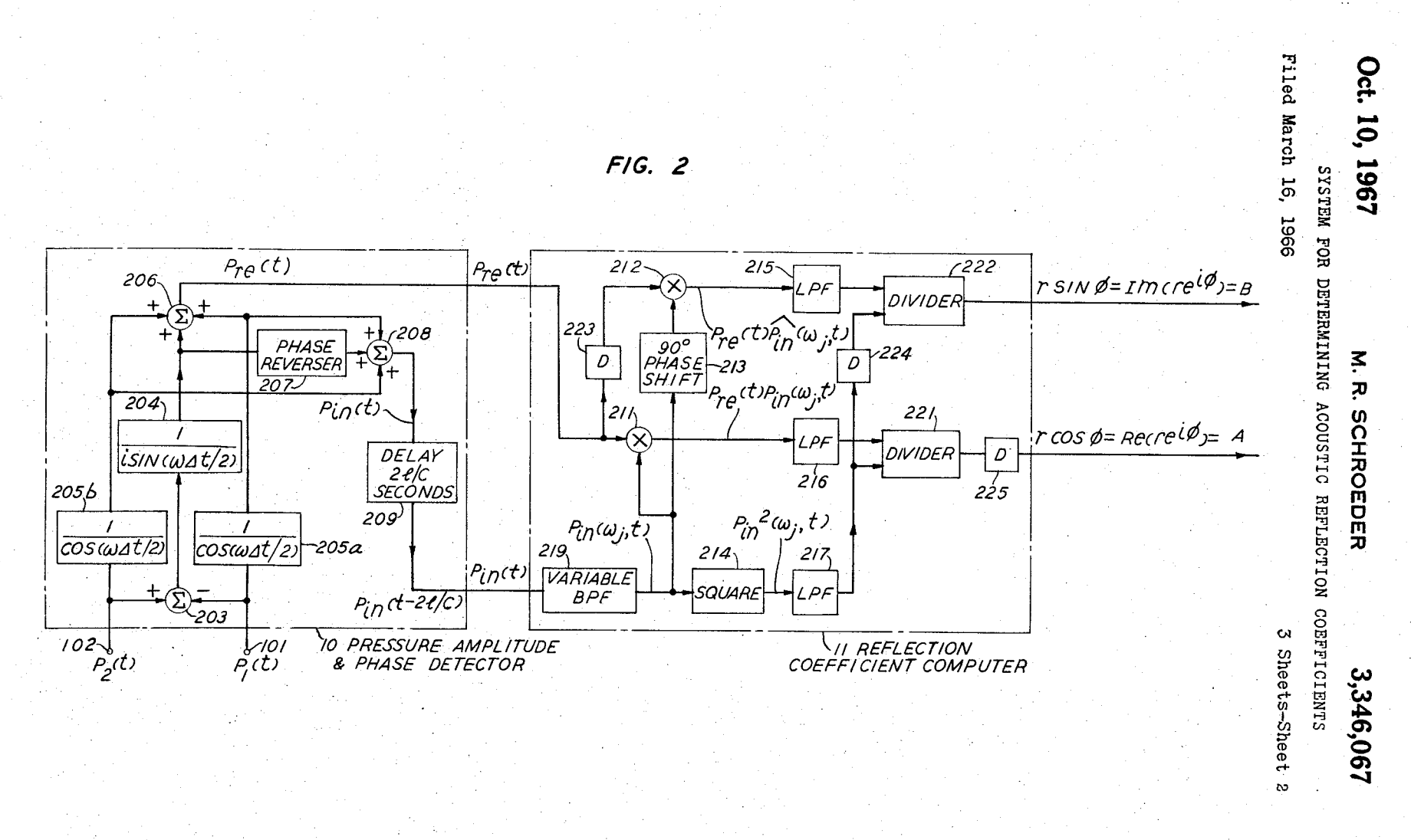

Oct. 10, 1967         M. R. SCHROEDER         3,346,067
SYSTEM FOR DETERMINING ACOUSTIC REFLECTION COEFFICIENTS
Filed March 16, 1966                    3 Sheets-Sheet 2

FIG. 2

# United States Patent Office 3,346,067
Patented Oct. 10, 1967

3,346,067
SYSTEM FOR DETERMINING ACOUSTIC REFLECTION COEFFICIENTS
Manfred R. Schroeder, Gillette, N.J., assignor to Bell Telephone Laboratories, Incorporated, New York, N.Y., a corporation of New York
Filed Mar. 16, 1966, Ser. No. 534,790
13 Claims. (Cl. 181—.5)

ABSTRACT OF THE DISCLOSURE

The complex reflection coefficient of a material is calculated automatically as a function of frequency from simultaneous measurements of the instantaneous amplitudes of pressure waves incident on, and reflected from, the material.

---

This invention relates to the measurement of the acoustic properties of materials and in particular, to the measurement of the complex reflection coefficients of materials. It has as a principal purpose the measurement of the complex reflection coefficients of materials over a wide range of frequencies.

The reflection coefficient, an important parameter in determining the acoustic characteristics of a material, is defined as the ratio of the amplitude of a reflected pressure wave to the amplitude of an incident pressure wave, both amplitudes being measured at the face of the material. In general, the reflection coefficient varies with the angle of incidence and is a complex, frequency-dependent quantity. It represents mathematically the fact that in general both the amplitude and the phase of the reflected pressure wave are altered in the reflection process relative to the amplitude and phase of the incident pressure wave.

The reflection coefficient is usually determined by use of a Kundt, or acoustic impedance, tube. The material whose reflection coefficient is to be measured is placed at one end of the tube and a source of a sinusoidal pressure wave is placed at the other end. The phase shift $\Phi$ of the complex reflection coefficient is determined by measuring the location of the minimum pressure $P_{min}$ closest to a point one-quarter wavelength from the reflecting material. The amplitude $r$ of the complex reflection coefficient is calculated from the minimum and maximum pressures in the tube.

The Kundt tube has several drawbacks if it is desired to determine the complex reflection coefficient rapidly over a broad frequency range. Each set of pressure measurements yields the complex reflection coefficient at only one frequency. To determine the coefficient as a function of frequency many repetitive measurements must be made. Because pressure probes must be moved along the length of the tube to detect the minimum and maximum pressures, the sound field is often disturbed. To measure the one-quarter wavelength point accurately, both the frequency of the pressure source and the temperature of the conducting medium within the tube must be carefully controlled. Thus, the measurement of reflection coefficients using the Kundt tube is a tedious and time consuming task.

This invention considerably simplifies the determination of the reflection coefficients of materials. In particular, as a result of this invention, the values of the reflection coefficient of a material over a wide range of frequencies at substantially normal angles of incidence can be automatically and simultaneously determined from a measurement of sound pressure at only two fixed spatial positions. The sound pressures are measured in such a manner that they are not influenced by the measuring process. Moreover, a precise frequency source is not required as either periodic or aperiodic pressure waves can be utilized, considerably simplifying the experimental techniques employed.

According to this invention, pressure pulses are transmitted along a rigid-walled guide and reflected from the material whose reflection coefficient is to be determined. The instantaneous amplitudes of the incident and the reflected pressure pulses are continuously but separately derived at selected frequencies from measurements of the sound pressures at two positions on a selected side of the guide. The complex ratio of the reflected to the incident pressure wave at each selected frequency is obtained and this ratio, when corrected for any phase shift and amplitude attenuation not attributable to the reflecting material, constiutes the reflection coefficient of the material at that frequency.

In accordance with one embodiment of this invention, periodic or aperiodic pressure waves are transmitted along the wave guide and reflected from the material at the end of the guide. Electrical signals generated by two pressure transducers spaced apart on the wall of the rigid-walled guide are combined to obtain a sum signal proportional to the sum of the amplitudes of the incident and reflected pressure waves and a difference signal. The difference signal is weighted to obtain a signal proportional to the amplitude difference between the reflected and incident waves. A signal proportional to the amplitude of the reflected pressure wave $P_{re}(t)$ is obtained by adding the weighted difference signal to the sum signal. A unique feature of this invention is that a signal proportional to the amplitude of the incident pressure wave $P_{in}(t)$ is simultaneously obtained simply by reversing the phase of the weighted difference signal and adding this phase-reversed signal to the sum signal.

To determine the reflection coefficient at several discrete frequencies over the frequency range of interest, a bank of bandpass filters with center or design frequencies $\omega_1 \ldots \omega_j \ldots \omega_n$ spaced over the selected frequency range is provided. The signal proportional to the incident pressure wave is passed through the bandpass filters to separate the frequency components $P_{in}(\omega_j, t)$ of the incident pressure wave. The average value of the real part, $A$, of the reflection coefficient $\rho = A + iB$ at the frequency $\omega_j$ is obtained by dividing the time-averaged product $\overline{P_{re}(t)P_{in}(\omega_j, t)}$ by $\overline{P_{in}^2(\omega_j, t)}$, the time averaged square of the component of the incident pressure wave at the frequency $\omega_j$. The average value of the imaginary part $B$ of the reflection coefficient at the same frequency is obtained by dividing the time-averaged product $\overline{P_{re}(t)\hat{P}_{in}(\omega_j, t)}$, where the caret ($\wedge$) means $P_{in}(\omega_j, t)$ is advanced $\pi/2$ radians, by $\overline{P_{in}^2(\omega_j, t)}$. The amplitude $r$ and phase $\Phi$ of the reflection coefficient $\rho = re^{i\phi}$ at the frequency $\omega_j$ can easily be obtained from its real, $A(\omega_j)$, and imaginary, $B(\omega_j)$, parts by using the well known relations $$r(\omega_j) = ([A(\omega_j)]^2 + [B(\omega_j)]^2)^{\frac{1}{2}}$$

and $$\Phi(\omega_j) = \tan^{-1}[B(\omega_j)/A(\omega_j)]$$

By substituting a single variable bandpass filter for the bank of bandpass filters, the complex reflection coefficient can be determined as a continuous function over a desired frequency range.

This invention will be more fully understood from the following detailed description of the operation of preferred embodiments thereof taken together with the following drawings in which:

FIG. 2 is a schematic block diagram of an embodiment of this invention utilizing a variable bandpass filter;

Figure 1:
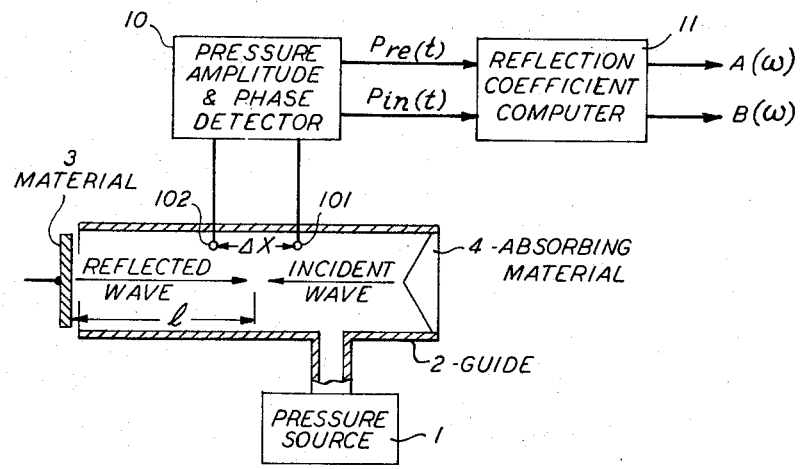
FIG. 1 is a schematic block diagram of one embodiment of this invention.

FIG. 1 shows one embodiment of this invention. An "incident" pressure wave, generated by pressure source 1, is injected through the side of rigid-walled guide 2 and is transmitted along the guide. Guide 2 can be rectangular or circular in cross section but its cross section dimensions must be sufficiently small relative to the wavelength of the incident pressure wave to prevent the propagation of cross modes. The pressure wave generated by source 1 is preferably periodic. This ensures that the incident pressure wave contains a sufficiently broad range of harmonic frequency components to make possible the measurement of the reflection coefficient of a material at harmonic frequencies over the desired frequency range. However, if desired, the incident pressure wave can be aperiodic. Since aperiodic waves have components at all frequencies, this makes possible the calculation of reflection coefficients at any desired frequency.

Material 3, whose reflection coefficient is to be determined, is placed at the end of guide 2, where it reflects the incident pressure wave. The reflected pressure wave, in general altered in both amplitude and phase by the reflection process, travels back along guide 2 toward the pressure source 1. To prevent multiple reflections, an acoustic absorbing material 4, such as an acoustic wedge, is placed at the end of guide 2.

Two pressure transducers 101, 102 are placed apart along the line of travel of the two pressure waves. Usually the transducers are spaced apart by less than one-half the wavelength of the highest frequency at which it is desired to determine the reflection coefficient. However, as will be shown later, accurate reflection coefficients can be determined at frequencies for which the transducer spacing is not approximately an integral multiple of the half wavelength. Transducers 101, 102 continuously generate two electrical signals proportional to the sound pressure at two points inside guide 2. These signals are continuously operated upon by amplitude and phase detector 10 to yield two output signals proportional to the instantaneous amplitudes $P_{in}(t)$ and $P_{re}(t)$ of the incident and reflected pressure waves, respectively. Reflection coefficient computer 11 utilizes these two output signals from detector 10 to calculate the real $A(\omega)$ and imaginary $B(\omega)$ parts of the complex reflection coefficient $\rho(\omega)$.

FIG. 2 shows one embodiment of amplitude and phase detector 10 and reflection coefficient computer 11 in more detail. Two pressure transducers 101, 102 generate electrical signals, $P_1(t)$ and $P_2(t)$, proportional to the sound pressure at two positions on the line of travel of the incident and reflected pressure waves. A signal representative of the difference in the instantaneous magnitudes of the two signals is produced by difference network 203. The difference signal is weighted as a function of frequency in network 204, and the transducer signals are weighted as a function of frequency in networks 205a and 205b. The weighted difference signal is added in adder 206 to the sum of the weighted transducer signals. The resulting signal is proportional solely to the amplitude of the reflected pressure wave $P_{re}(t)$.

The weighted difference signal from network 204 is also passed through phase reverser 207 and added in adder 208 to the sum of the weighted output signals from transducers 101, 102. The resulting signal is proportional solely to the amplitude of the incident pressure wave $P_{in}(t)$.

These results can be vertified by the following analysis. It should be noted in this analysis that the phases of both the incident and reflected pressure waves at different spatial locations are expressed in terms of the travel time to or from the midpoint between transducers 101, 102.

The electrical signal $P_1(t)$ generated by transducer 101 is made up of the sum of two components; one representing the instantaneous amplitude of the incident pressure wave $P_{in}(t+\Delta t/2)$ as it will be $\Delta t/2$ seconds later at the midpoint between the transducers, and the other representing the instantaneous amplitude of the reflected pressure wave $P_{re}(t-\Delta t/2)$ as it was $\Delta t/2$ seconds earlier at the midpoint between the transducers. The time $\Delta t$ is the travel time of a pressure wave at velocity $c$ over the distance $\Delta x$ between transducers 101, 102.

The signal $P_2(t)$ generated by transducer 102 likewise is composed of the sum of two components; one representing the instantaneous amplitude of the incident pressure wave $P_{in}(t-\Delta t/2)$ as it was at the midpoint between transducers $\Delta t/2$ seconds earlier in time, and the other representing the instantaneous amplitude of the reflected pressure wave $P_{re}(t+\Delta t/2)$ as it will be at the transducer midpoint $\Delta t/2$ seconds later in time. The above expressions assume negligible attenuation and distortion in transmission. Thus $$P_1(t) = P_{in}(t+\Delta t/2) + P_{re}(t-\Delta t/2) \quad (1)$$

and $$P_2(t) = P_{in}(t-\Delta t/2) + P_{re}(t+\Delta t/2) \quad (2)$$

Equations 1 and 2 can easily be solved for the amplitudes of the incident and reflected pressure waves if the terms in these equation are transformed to the frequency domain. The Fourier transform of an advance or delayed time function $P(t \pm \tau)$ is the Fourier transform $P(\omega)$ of the time function $P(t)$ multiplied by the phase shift $e^{\pm i\omega\tau}$ equivalent to the time advance or delay $\tau$. The Fourier transforms of Equations 1 and 2 are $$P_1(\omega) = P_{in}(\omega)e^{i\omega\Delta t/2} + P_{re}(\omega)e^{-i\omega\Delta t/2} \quad (3)$$

and $$P_2(\omega) = P_{in}(\omega)e^{-i\omega\Delta t/2} + P_{re}(\omega)e^{i\omega\Delta t/2} \quad (4)$$

The term $\omega$ represents frequency in radians per second.

Equations 3 and 4 can be solved for $P_{in}(\omega)$ and $P_{re}(\omega)$ in terms of $P_1(\omega)$, $P_2(\omega)$ and the exponential delay terms. However, solutions for $P_{in}(\omega)$ and $P_{re}(\omega)$ exist only when the determinant of their coefficients $[e^{i\omega\Delta t} - e^{-i\omega\Delta t}]$ does not equal zero. This determinant equals zero when $$e^{i\omega\Delta t} = e^{-i\omega\Delta t}$$

or equivalently, when $i \sin \omega\Delta t = -i \sin \omega\Delta t$. Thus, when $\omega\Delta t = 0, \pi, 2\pi \ldots$ or, since $\omega\Delta t = 2\pi f \Delta x/c = 2\pi \Delta x/\lambda$ where $\lambda$ = wavelength, when $\Delta x = 0, \lambda/2, \lambda, 3\lambda/2 \ldots$ no solutions exist for $P_{in}(\omega)$ and $P_{re}(\omega)$. For all other values of $\Delta x$, $P_{in}(\omega)$ and $P_{re}(\omega)$ do have solutions. They are $$P_{in}(\omega) = \frac{1}{e^{i\omega\Delta t} - e^{-i\omega\Delta t}} [P_1(\omega)e^{i\omega\Delta t/2} - P_2(\omega)e^{-i\omega\Delta t/2}] \quad (5)$$

$$P_{re}(\omega) = \frac{1}{e^{i\omega\Delta t} - e^{-i\omega\Delta t}} [P_2(\omega)e^{i\omega\Delta t/2} - P_1(\omega)e^{-i\omega\Delta t/2}] \quad (6)$$

Equations 5 and 6 can be written in a variety of ways to illustrate different possible embodiments of detector 10 for calculating $P_{in}(\omega)$ and $P_{re}(\omega)$. An embodiment alternative to that shown in FIG. 2 utilizes delay lines as shown in FIG. 4 and is based on the following two versions of Equations 5 and 6.

$$P_{in}(\omega) = \frac{e^{-i\omega\Delta t/2}}{[1 - e^{-i\omega 2\Delta t}]} [P_1(\omega) - P_2(\omega)e^{-i\omega\Delta t}] \quad (7)$$

$$P_{re}(\omega) = \frac{e^{-i\omega\Delta t/2}}{[1 - e^{-i\omega 2\Delta t}]} [P_2(\omega) - P_1(\omega)e^{-i\omega\Delta t}] \quad (8)$$

Figure 4:
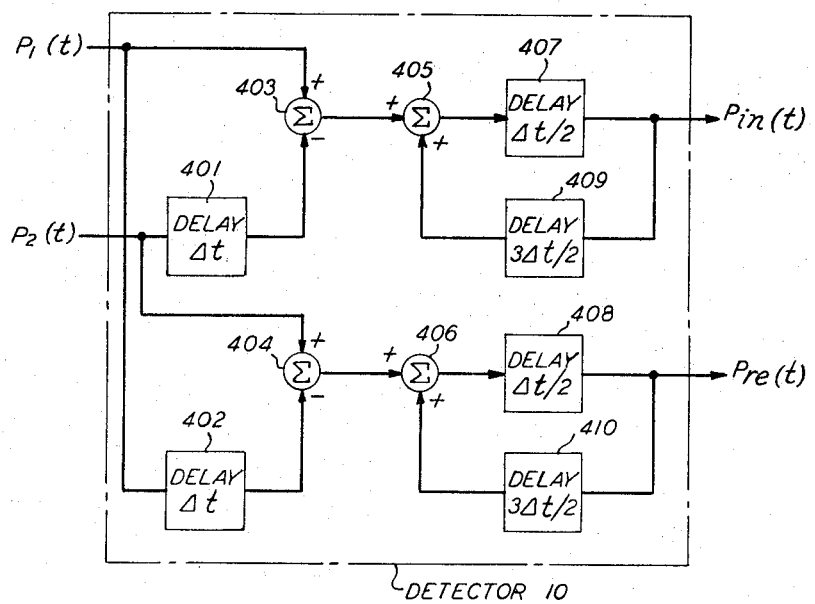
FIG. 4 is a schematic block diagram of one embodiment of detector 10 used in FIG. 1.

In FIG. 4, $P_{in}(\omega)$, or equivalently, $P_{in}(t)$, is obtained by use of the odd-numbered circuit elements and $P_{re}(\omega)$, or equivalently $P_{re}(t)$, is obtained by use of the remaining even-numbered circuit elements. To calculate $P_{in}(\omega)$, $P_2(\omega)$ is delayed $\Delta t$ seconds in delay 401, and then subtracted in difference network 403 from $P_1(\omega)$. The difference $P_1(\omega) - P_2(\omega)e^{-i\omega\Delta t}$ is summed in adding network 405 with the feedback signal from delay 409. The sum signal from network 405 is delayed $\Delta t/2$ seconds in delay network 407 to yield the output signal $P_{in}(\omega)$. This output signal, when delayed by $3\Delta t/2$ seconds in delay network 409, constitutes the feedback signal. $P_{re}(\omega)$ is obtained in a similar manner from the even-numbered elements of FIG. 4.

Equations 5 and 6 can also be written as $$4P_{in}(\omega) = [P_1(\omega) + P_2(\omega)]\frac{1}{\cos \omega \Delta t/2} - [P_2(\omega) - P_1(\omega)]\frac{1}{i \sin \omega \Delta t/2} \quad (9)$$

and $$4P_{re}(\omega) = [P_1(\omega) + P_2(\omega)]\frac{1}{\cos \omega \Delta t/2} + [P_2(\omega) - P_1(\omega)]\frac{1}{i \sin \omega \Delta t/2} \quad (10)$$

Equations 9 and 10 show that the reflected and incident pressure waves can be determined by multiplying the difference signal $[P_2(\omega) - P_1(\omega)]$ by the frequency dependent term $1/i(\sin \omega \Delta t/2)$, multiplying the sum signal $[P_1(\omega) + P_2(\omega)]$ by the frequency dependent term $$1/\cos \omega \Delta t/2$$

and respectively adding or subtracting the resulting products. Thus networks 205a and 205b in detector 10 of FIG. 2 weight the output signals $P_1(\omega)$, $P_2(\omega)$ from transducers 101, 102 by $1/\cos \omega \Delta t/2$ while network 204 weights the difference signal from network 203 by $1/i(\sin \omega \Delta t/2)$.

As the term $\omega \Delta t/2$ becomes small relative to $\pi/2$, Equations 9 and 10 can be written in the following approximate form. Here, the term $\Delta t$ has been replaced by its equivalent $\Delta x/c$.

$$4P_{in}(\omega) \cong P_1(\omega) + P_2(\omega) - \frac{2c}{i\Delta x \omega}[P_2(\omega) - P_1(\omega)] \quad (11)$$

and $$4P_{re}(\omega) \cong P_1(\omega) + P_2(\omega) + \frac{2c}{i\Delta x \omega}[P_2(\omega) - P_1(\omega)] \quad (12)$$

Since multiplication by $1/i\omega$ in the frequency domain corresponds to integration in the time domain, weighting network 204 can be considered an integrator for $$\omega \Delta x/2c \ll \pi/2$$

Under the same condition, weighting networks 205a and 205b can be considered to be unity amplifiers.

The term $\omega \Delta t/2$ can also be written as $\pi f \Delta x/c$ where $f$ is frequency in cycles per second. As $\pi f \Delta x/c \to \pi/2, 3\pi/2, 5\pi/2 \ldots$, or as $\Delta x \to \lambda/2, 3\lambda/2, 5\lambda/2 \ldots$ where wavelength $\lambda = c/f$, the term $1/\cos \omega \Delta t/2$ approaches infinity because the denominator approaches zero. Similarly, as $\pi f \Delta x/c \to 0, \pi, 2\pi, 3\pi \ldots$, or as $\Delta x \to 0, \lambda, 2\lambda, 3\lambda \ldots$, the term $1/i \sin \omega \Delta t/2$ approaches infinity. Thus detector 10 yields optimum results over frequencies between the ranges $0 < \Delta x < \lambda/2 < \Delta x < \lambda < \ldots$.

While the amplitudes of the incident and reflected pressure waves are given as a function of frequency by Equations 5 through 12, detector 10 of course yields time varying signals proportional to the amplitudes of the incident and reflected waves.

It is appropriate to consider the phase relationship between the reflected and incident pressure waves derived in adders 206 and 208, respectively. At a point midway between transducers 101, 102 the incident wave leads the reflected wave by $2l/c$ seconds where $l$ is the distance from the midpoint between the two transducers to the reflecting material. To ensure that the complex reflection coefficient represents solely the effects of the reflection process, all relative phase difference between the incident and reflected pressure waves due to the travel time between the midpoint of the pressure transducers and the reflecting material must be removed. This is done by delaying the incident pressure wave $2l/c$ seconds in delay 209.

Since the amplitude attenuation and phase distortion of the incident and reflected pressure waves while traveling between the pressure transducers and the reflecting material are negligibly small, the output signals $$P_{in}\left(t - \frac{2l}{c}\right)$$

and $P_{re}(t)$ from detector 10 at any instant of real time $t$, represent the amplitudes and phases of the incident and the reflected pressure waves, respectively, at the face of the reflecting material $l/c$ seconds earlier in time. For convenience and simplicity in notation, the output signals from detector 10 will hereafter be referred to as $P_{in}(t)$ and $P_{re}(t)$ where it is understood that the variable $t$ refers only to the real time signals from detector 10 and implies nothing as to the phase relationship between these signals.

The two output signals from detector 10 are sent to reflection coefficient computer 11 where they are used to calculate the real and imaginary parts of the complex reflection coefficient $\rho = A + iB$. In computer 11 (FIG. 2), the output signal from detector 10 proportional to the incident pressure wave $P_{in}(t)$ is passed through bandpass filter 219 to remove all but a selected frequency component $\omega_j$. Bandpass filter 219 is variable over the frequency range in which it is desired to determine the reflection coefficient.

The filtered signal proportional to the incident pressure wave $P_{in}(\omega_j, t)$ is multiplied by itself or squared in network 214 and then passed through low pass filter 217 to yield a signal proportional to $\overline{P_{in}^2(\omega_j, t)}$ where $(^-)$ means the average value. The signal $P_{in}(\omega_j, t)$ is multiplied by $P_{re}(t)$ in multiplier 211 to obtain a signal proportional to the product $P_{re}(t)P_{in}(\omega_j, t)$. This product signal is passed through low pass filter 216 to give a signal proportional to $\overline{P_{re}(\omega_j, t)P_{in}(\omega_j, t)}$. A signal proportional to the real part, $r \cos \Phi = A$, of the complex reflection coefficient at frequency $\omega_j$ is obtained by dividing the output signal from filter 216 by the output signal from filter 217 in network 221.

The filtered incident wave, $P_{in}(\omega_j, t)$ is advanced by ninety degrees, $\pi/2$, in phase shifter 213 and then multiplied by $P_{re}(t)$ in multiplier 212. The phase shift of $P_{in}(\omega_j, t)$ in shifter 213 takes a short but finite time. Thus delays 223, 224, and 225 are provided to compensate for this time and to ensure that the instantaneous values of the real and imaginary parts of the complex reflection coefficient obtained from computer 11 are in time synchrony. The resulting signal is passed through low pass filter 215 to yield a signal proportional to $$\overline{P_{re}(t)\hat{P}_{in}(\omega_j, t)}$$

where $(\wedge)$ represents $P_{in}(\omega_j, t)$ advanced in phase by ninety degrees. When $\overline{P_{re}(t)\hat{P}_{in}(\omega_j, t)}$ is divided in divider 222 by $\overline{P_{in}^2(\omega_j, t)}$, the resulting signal is equal to $r \sin \Phi$, the imaginary part B of the complex reflection coefficient $\rho$ at frequency $\omega_j$.

Figure 3:
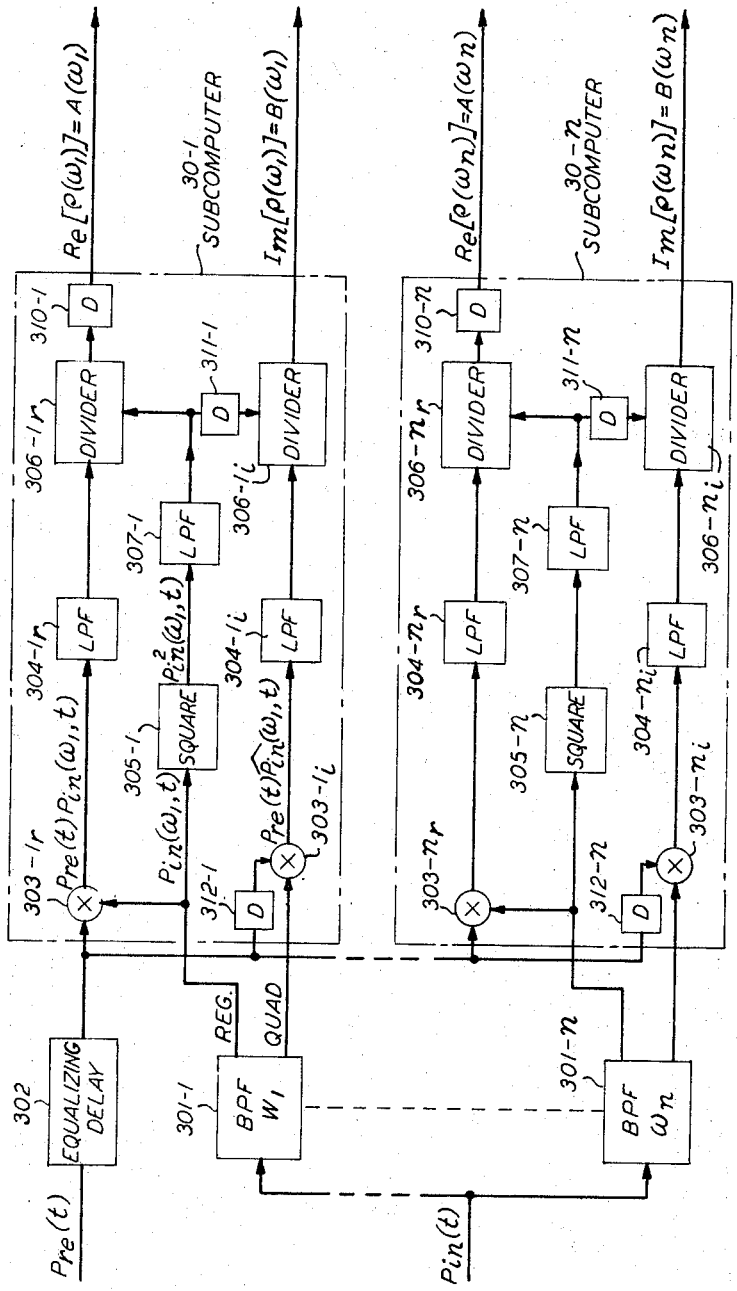
FIG. 3 is a schematic block diagram of an embodiment of this invention utilizing a bank of bandpass filters.

FIG. 3 shows a complex reflection coefficient computer capable of simultaneously computing from $P_{re}(t)$ and $P_{in}(t)$ the reflection coefficient $\rho$ at $n$ different frequencies. A bank of $n$ bandpass filters 301 arranged in parallel receives the signal proportional to the incident pressure wave $P_{in}(t)$, wherein $n$ is a selected positive integer. Each of the bandpass filters 301 is selected to pass the signal's component at a selected frequency $\omega_j$ while remaining unresponsive to the signal's components at other frequencies, where $j$ is an integer given by $1 \leq j \leq n$. Each bandpass filter 301 is selected to have two output signals, one proportional to $P_{in}(\omega_j, t)$ and the other proportional to $P_{in}(\omega_j, t)$ advanced by ninety degrees or $\hat{P}_{in}(\omega_j, t)$. Delays 310, 311 and 312 compensate for the time required to obtain $\hat{P}_{in}(\omega_j, t)$, and ensure time synchronization of the output signals from all subcomputers 30. The signal proportional to the reflected pressure wave $P_{re}(t)$ is also delayed by equalizing delay 302 to compensate for the delay of the signals proportional to $P_{in}(\omega_j, t)$ in bandpass filters 301.

The computer shown in FIG. 3 contains $n$ functionally identical subcomputers 30 for simultaneously calculating the values of the reflection coefficient at $n$ different frequencies. Each subcomputer 30 works in a manner identical to that of computer 11 in FIG. 2. Referring to subcomputer 30–1, the product $P_{re}(t)P_{in}(\omega_1, t)$ is formed in multiplier 303–1$r$ and the product $P_{re}(t)\hat{P}_{in}(\omega_1, t)$ is formed in multiplier 303–1$i$. Because the signal $P_{re}(t)$ has not been filtered, the products formed in multipliers 303–1$r$ and 303–1$i$ contain numerous sum and difference frequencies. However, these sum and difference frequencies are removed by low-pass filters 304–1$r$ and 304–1$i$ so the output signals from these filters are proportional to the average real and imaginary values of the complex reflection coefficient at the frequency $\omega_1$.

The term $P_{in}^2(\omega_1, t)$ is obtained from squarer 305–1 and the average value of $P_{in}^2(\omega_1, t)$ is obtained by passing this squared signal through low-pass filter 307–1. By dividing the output signals from filters 304–1$r$ and 304–1$i$ by the average value $P_{in}^2(\omega_1, t)$ in dividers 306–1$r$ and 306–1$i$, signals equal to the real and imaginary parts of the complex reflection coefficient at the frequency $\omega_1$ are obtained.

The other subcomputers 30 work in a similar manner but of course yield the real and imaginary parts of the complex reflection coefficient at the remaining discrete frequencies $\omega_2 \ldots \omega_j \ldots \omega_n$.

The real and imaginary parts of the reflection coefficient at selected frequencies can be used to interpolate the real and imaginary values of the reflection coefficient at intermediate frequencies thus making it possible to specify the complex reflection coefficient over a broad range of frequencies.

Other embodiments incorporating the principles of this invention will be obvious to those skilled in the acoustic arts. In particular, embodiments designed to yield signals equal directly to the amplitude $r$ and phase $\Phi$ of the complex reflection coefficient at selected frequencies will be apparent. Also, other embodiments of detector 10, equivalent to the embodiments shown in FIGS. 2 and 4, will be made obvious by rearranging Equations 5 and 6. Moreover, while the embodiments of this invention have been described assuming the incident pressure wave to be normally incident on the reflecting material, this invention can be adapted to measure the reflection coefficient for non-normal angles of incidence.

What is claimed is:

1. Apparatus which comprises
   means for directing a pressure wave to be incident upon a reflecting material;
   means for simultaneously measuring the instantaneous amplitudes of said incident pressure wave and the pressure wave reflected from said material; and
   means for deriving from said measured amplitudes the real and imaginary parts of the complex reflection coefficient of said reflecting material at a selected frequency.

2. Apparatus which comprises
   means for producing a pressure wave;
   means for directing said pressure wave to be incident upon a reflecting material;
   means for simultaneously measuring the instantaneous amplitudes of said incident pressure wave and the pressure wave reflected from said material; and
   means for deriving from said measured amplitudes the real and imaginary parts of the complex reflection coefficient of said reflecting material at a selected frequency.

3. Apparatus which comprises
   means for directing a periodic pressure wave to be normally incident upon a reflecting material;
   means for simultaneously generating a first set of two signals, $P_{in}(t)$ and $P_{re}(t)$, representing respectively the instantaneous amplitudes of said incident pressure wave and the pressure wave reflected from said material; and
   means for deriving from said first set of two signals $n$ sets of two signals equal to the real and imaginary parts of the complex reflection coefficient of said reflecting material at $n$ selected frequencies, where $n$ is a selected positive integer.

4. Apparatus as in claim 3 wherein said generating means comprises means for generating a second set of two signals $P_1(t)$ and $P_2(t)$ proportional to the instantaneous combined pressures of said incident and reflected pressure waves at two spatial locations;
   means for synthesizing from said second set of two signals a difference signal equal to $P_2(t) - P_1(t)$;
   means for weighting said difference signal by a first selected frequency-dependent amount;
   means for weighting said second set of signals $P_1(t)$ and $P_2(t)$ by a second selected frequency-dependent amount; and
   means for combining said weighted difference signal with said weighted second set of two signals to yield two output signals proportional to the amplitudes of said incident and reflected pressure waves.

5. Apparatus as in claim 3 wherein said generating means comprises two pressure transducers spaced apart on the line of travel of said incident and reflected pressure waves, said transducers generating two signals $P_1(t)$ and $P_2(t)$ proportional to the instantaneous pressures at two spatial locations;
   means for producing from said two signals a third signal proportional to $P_2(t) - P_1(t)$;
   means for weighting said third signal by $$[1/i \sin(\omega \Delta t/2)]$$

where $i$ equals $e^{i\pi/2}$, $\omega$ is frequency in radians per second, and $\Delta t$ is the travel time of a pressure wave between said two spatial locations;
   means for weighting $P_1(t)$ and $P_2(t)$ by $$[1/\cos(\omega \Delta t/2)];$$

means for producing a first output signal proportional to the amplitude of said reflected pressure wave by adding said weighted third signal to said two weighted signals from said two transducers;
   means for reversing the phase of said weighted third signal; and
   means for producing a second output signal proportional to the amplitude of said incident pressure wave by adding said phase-reversed, weighted, third signal to said two weighted signals from said two transducers.

6. Apparatus as in claim 3 wherein said generating means comprises
   means for producing a first and a second signal proportional to the instantaneous pressures generated by two oppositely traveling pressure waves at a first and a second spatial location;
   means for delaying said first signal a first selected amount;
   means for subtracting said delayed first signal from said second signal to produce a first difference signal;
   means for adding a first feedback signal to said first difference signal to produce a third signal,
   means for delaying said third signal a second selected amount to produce a fourth signal proportional to a selected one of said two oppositely traveling pressure waves;
   means for delaying said fourth signal by a third selected amount to produce said first feedback signal;

means for delaying said second signal said first selected amount;

means for subtracting said delayed second signal from said first signal to produce a second difference signal;

means for adding a second feedback signal to said second difference signal to produce a fifth signal;

means for delaying said fifth signal said second selected amount to produce a sixth signal proportional to the other of said two oppositely traveling pressure waves; and means for delaying said sixth signal said third selected amount to produce said second feedback signal.

7. Apparatus as in claim 3 wherein said deriving means comprises means for removing any relative phase difference not attributable to the reflection process between signals representing said incident and reflected pressure waves;

means for filtering said signal representing said incident pressure wave to allow the passage of a selected frequency component of said signal while rejecting all other components of said signal;

means for obtaining the product of said filtered signal and the signal representing said reflected pressure wave;

means for advancing said filtered signal by $\pi/2$ radians;

means for compensating for delay introduced by said advancing means, means for obtaining the product of said advanced signal and said signal representing said reflected pressure wave;

means for obtaining the square of said filtered signal;

means for obtaining the average values of said two products and said square; and means for dividing the average values of said two products by the average value of said square to yield two output signals equal to the real and imaginary parts of the complex reflection coefficient at said selected frequency.

8. Apparatus as in claim 3 wherein said deriving means comprises means for compensating for any phase shift between said signals $P_{in}(t)$ and $P_{re}(t)$ not attributable to the reflection of said incident pressure wave from said reflecting material;

a plurality of $n$ parallel-connected bandpass filtering means to pass $n$ selected frequency components $\omega_1 \ldots \omega_j \ldots \omega_n$ of said signal $P_{in}(t)$, each filtering means being designed to produce two output signals $P_{in}(\omega_j, t)$ and $\hat{P}_{in}(\omega_j, t)$ at one selected frequency $\omega_j$, $\hat{P}_{in}(\omega_j, t)$ being advanced by $\pi/2$ radians relative to $P_{in}(\omega_j, t)$; and a plurality of $n$ computers corresponding on a one-to-one basis to said plurality of $n$ filtering means, the $j^{th}$ of said computers utilizing both said two output signals $P_{in}(\omega_j, t)$ and $\hat{P}_{in}(\omega_j, t)$ from the corresponding $j^{th}$ filtering means and said signal $P_{re}(t)$ to compute the real and imaginary values of the complex reflection coefficient of the reflecting material at frequency $\omega_j$, where $j$ is an integer given by $1 \leq j \leq n$.

9. Apparatus as in claim 8 wherein the $j^{th}$ of said plurality of $n$ computers comprises first multiplying means for obtaining a signal proportional to a first product, $P_{re}(t)P_{in}(\omega_j, t)$;

second multiplying means for obtaining a signal proportional to a second product, $P_{re}(t)\hat{P}_{in}(\omega_j, t)$;

means for squaring $P_{in}(\omega_j, t)$ to obtain a signal proportional to the squared term $P_{in}^2(\omega_j, t)$;

means for obtaining time synchronizing between $P_{re}(t)$, $P_{in}(\omega_j, t)$ and $\hat{P}_{in}(\omega_j, t)$;

low-pass filter means for obtaining signals proportional to the average values of said two products and said squared term;

first dividing means for dividing said signal proportional to the average value of said first product by said signal proportional to the average value of said squared term to yield a signal equal to the real part of said complex reflection coefficient at the frequency $\omega_j$; and second dividing means for dividing said signal proportional to the average value of said second product by said signal proportional to the average value of said squared term to yield a signal equal to the imaginary part of said complex reflection coefficient at the frequency $\omega_j$.

10. Apparatus which comprises means at two spatial locations for generating two signals $P_1(t)$ and $P_2(t)$ proportional to the instantaneous combined pressures of two oppositely traveling pressure waves;

means for synthesizing from said two signals a difference signal equal to $P_2(t) - P_1(t)$;

means for weighting said difference signal $P_2(t) - P_1(t)$ by a first selected frequency-dependent amount;

means for weighting said two signals $P_1(t)$ and $P_2(t)$ by a second selected frequency-dependent amount; and means for combining said weighted difference signal with said two weighted signals to yield two output signals proportional to the amplitudes of each of said oppositely traveling pressure waves.

11. Apparatus which comprises two pressure transducers spaced apart on the line of travel of two oppositely traveling pressure waves, said transducers producing two signals proportional to the instantaneous pressures generated by said two pressure waves at two spatial locations;

means for producing from said two signals a third signal equal to the difference between said two signals;

means for weighting said third signal by $1/i \sin \omega \Delta t/2$ where $i$ equals $e^{i\pi/2}$, $\omega$=frequency in radians per second and $\Delta t$ is the travel time of a pressure wave between said two spatial locations;

means for weighting each of said two signals by $1/\cos \omega \Delta t/2$;

means for producing a first output signal proportional to the amplitude of a selected one of said two oppositely traveling pressure waves by adding said weighted third signal to said weighted two signals;

means for reversing the phase of said weighted third signal; and means for producing a second output signal proportional to the amplitude of the other of said two oppositely traveling pressure waves by adding said phase-reversed, weighted, third signal to said weighted two signals.

12. In combination, two pressure transducers spaced apart on the line of travel of two oppositely traveling pressure waves, said transducers producing two signals $P_1(t)$ and $P_2(t)$ proportional to the instantaneous pressures generated by said two pressure waves at two spatial locations;

means for weighting $P_1(t)$ by a first selected frequency-dependent amount to produce a third signal;

means for weighting $P_2(t)$ by a second selected frequency-dependent amount to produce a fourth signal;

means for combining said third and fourth signals to produce an output signal proportional to a selected one of said two oppositely traveling pressure waves;

means for weighting $P_1(t)$ by said second selected frequency-dependent amount to produce a fifth signal;

means for weighting $P_2(t)$ by said first selected frequency-dependent amount to produce a sixth signal; and means for combining said fifth and sixth signals to produce an output signal proportional to the other of said two oppositely traveling pressure waves.

13. Apparatus which comprises means for producing a first and a second signal proportional to the instantaneous pressures generated by two oppositely traveling pressure waves at a first and a second spatial location;

means for delaying said first signal a first selected amount;

means for subtracting said delayed first signal from said second signal to produce a first difference signal;

means for adding a first feedback signal to said first difference signal to produce a third signal;

means for delaying said third signal a second selected amount to produce a fourth signal proportional to a selected one of said two oppositely traveling pressure waves;

means for delaying said fourth signal by a third selected amount to produce said first feedback signal;

means for delaying said second signal said first selected amount;

means for subtracting said delayed second signal from said first signal to produce a second difference signal;

means for adding a second feedback signal to said second difference signal to produce a fifth signal;

means for delaying said fifth signal said second selected amount to produce a sixth signal proportional to the other of said two oppositely traveling pressure waves; and means for delaying said sixth signal said third selected amount to produce said second feedback signal.

References Cited

UNITED STATES PATENTS

| | | | |
|---|---|---|---|
| 1,743,414 | 1/1930 | Wente | 73—69 |
| 1,795,647 | 3/1931 | Flanders | 73—67.1 X |
| 2,394,461 | 2/1946 | Mason | 181—.5 X |
| 2,837,914 | 6/1958 | Caldwell | 181—.5 X |
| 3,030,803 | 3/1962 | Painter | 73—67.1 |
| 3,057,188 | 10/1962 | Henry | 73—67.1 |
| 3,288,241 | 11/1966 | Bancroft et al. | 181—.5 |

OTHER REFERENCES

Hilton et al., Acoustical Impedance and Absorption Coefficients, American Journal of Physics, November 1949, volume 117, No. 8, pp. 500–502.

BENJAMIN A. BORCHELT, *Primary Examiner.*

R. M. SKOLNIK, *Assistant Examiner.*